(12) United States Patent
Waller et al.

(10) Patent No.: US 12,019,315 B2
(45) Date of Patent: Jun. 25, 2024

(54) OPTICAL DEVICE FOR ENHANCING THE WELL-BEING OF A WEARER

(71) Applicant: LULULEMON ATHLETICA CANADA INC., Vancouver (CA)

(72) Inventors: Thomas McCarthy Waller, Vancouver (CA); Siân Elizabeth Slawson, Vancouver (CA); Sian Victoria Allen, Vancouver (CA); Todd James Smith, Vancouver (CA); Nils Johan Edzén, Vancouver (CA); Kerem Dogurga, Vancouver (CA); Philip David Siwek, Vancouver (CA); Timothy Ryan McGee, Vancouver (CA); Kate Alexandria Macmillan, Vancouver (CA); Navjot Kailay, Vancouver (CA); Ellisa Kathleen Calder, Vancouver (CA); William Ly, Vancouver (CA)

(73) Assignee: LULULEMON ATHLETICA CANADA INC., Vancouver (CA)

( * ) Notice: Subject to any disclaimer, the term of this patent is extended or adjusted under 35 U.S.C. 154(b) by 404 days.

(21) Appl. No.: 17/612,927

(22) PCT Filed: May 22, 2020

(86) PCT No.: PCT/CA2020/050691
§ 371 (c)(1),
(2) Date: Nov. 19, 2021

(87) PCT Pub. No.: WO2020/237352
PCT Pub. Date: Dec. 3, 2020

(65) Prior Publication Data
US 2022/0229314 A1 Jul. 21, 2022

Related U.S. Application Data

(60) Provisional application No. 62/852,878, filed on May 24, 2019.

(51) Int. Cl.
*G02C 7/10* (2006.01)

(52) U.S. Cl.
CPC ............ *G02C 7/10* (2013.01); *G02C 7/101* (2013.01); *G02C 2200/04* (2013.01)

(58) Field of Classification Search
CPC ...... G02C 7/10; G02C 7/101; G02C 2200/04; G02C 11/10; G02B 5/223; G02B 5/23; G02F 1/15; G02F 1/153
(Continued)

(56) References Cited

U.S. PATENT DOCUMENTS

2010/0027768 A1    11/2010   Shehadeh et al.
2022/0229314 A1*    7/2022   Waller .................... G02C 7/10

FOREIGN PATENT DOCUMENTS

EP          3367160 A1    8/2018
WO    2010/111499 A1    9/2010

OTHER PUBLICATIONS

Alkozei A, Smith R, Pisner DA, et al. Exposure to Blue Light Increases Subsequent Functional Activation of the Prefrontal Cortex During Performance of a Working Memory Task. Sleep. 2016;39(9):1671-1680. Published Sep. 1, 2016. doi: 10.5665/sleep. 6090.
(Continued)

*Primary Examiner* — Tuyen Tra

(57) ABSTRACT

The disclosure provides an optical device for enhancing the well-being of a wearer. The optical device includes a frame, at least one lens connected to the frame, at least one filter configured to engage with the at least one lens, at least one second filter configured to engaged with the at least one lens, and a modulating mechanism in communication with the frame, the at least one lens, the at least one first filter and/or the at least one second filter for modulating the at least one first filter and the at least one second filter. The at least one
(Continued)

first filter attenuates light at wavelengths in the visible blue light spectral region. The at least one second filter attenuates light at wavelengths of the visible spectral region outside of the visible blue light spectral region.

18 Claims, 5 Drawing Sheets

(58) Field of Classification Search
USPC .................................. 351/41, 159.01, 159.39
See application file for complete search history.

(56) References Cited

OTHER PUBLICATIONS

Barrau et al., Narrow blue-blocker eyewear significantly limits melatonin suppression and sleep quality reduction due to moderate light exposure before bedtime, 2017 ARVO Poster No. 4134 #B0253.
Barrau et al., A highly selective filter of circadian light improves sleep quality and limits the melatonin suppression induced by light at night, ARVO 2019, Abstract.
Barrau_13 Chronopass, Circadian rhythms—Essilor, 2019.
Iskra-Golec et al. (2017) Adv. Cogn. Psychol. 13(3): 241-247.
Melanie Knufinke, Arne Nieuwenhuys, Sabine A.E. Geurts, Els I.S. Møst, Maarten H. Moen, Kamiel Maase, Anton M.L. Coenen, Marijke C.M. Gordijn & Michiel A.J. Kompier (2021) Dim light, sleep tight, and wake up bright—Sleep optimization in athletes by means of light regulation, European Journal of Sport Science, 21:1, 7-15, DOI: 10.1080/17461391.2020.1722255.
Schilling T, Sipatchin A, Chuang L and Wahl S (2019) Looking Through "Rose-Tinted" Glasses: The Influence of Tint on Visual Affective Processing. Front. Hum. Neurosci. 13:187.
Véronique Daneault, MSc, Marc Hébert, PhD, Geneviéve Albouy, PhD, Julien Doyon, PhD, Marie Dumont, PhD, Julie Carrier, PhD, Gilles Vandewalle, PhD, Aging Reduces the Stimulating Effect of Blue Light on Cognitive Brain Functions, Sleep, vol. 37, Issue 1, Jan. 2014, pp. 85-96, https://doi.org/10.5665/sleep.3314.
International Search Report dated Jul. 24, 2020 for International Application No. PCT/CA2020/050691.
Written Opinion dated Jul. 24, 2020 for International Application No. PCT/CA2020/050691.

* cited by examiner

OPTICAL DEVICE FOR ENHANCING THE WELL-BEING OF A WEARER

FIELD

This disclosure relates to an optical device for enhancing the well-being of a wearer. In particular, the disclosure relates to an optical device comprising at least two filters for attenuating different wavelengths of light that can be modulated by the wearer or modulated automatically.

BACKGROUND

Natural sunlight changes during the course of the day. At dawn and dusk, it contains relatively high red and yellow wavelengths, whereas during the day, it has increased blue wavelengths. These changes in natural sunlight match the circadian rhythm of humans. Circadian rhythms exhibit roughly a 24-hour pattern and are observed in various physiological functions such as sleep/wake cycle, mood and alertness.

It has been found that certain wavelengths of light are projected to regions of the central nervous system responsible for the regulation of circadian rhythms. One downstream molecule that regulates circadian rhythms is melatonin. Melatonin expression is lower during the waking hours and increases shortly before and during sleep. It has been found that blue light suppresses the production of melatonin. As a result, during the day when natural sunlight contains the most blue wavelengths, melatonin production is suppressed and people feel awake. In the evening, when natural sunlight contains fewer blue wavelengths and more red and yellow wavelengths, melatonin production increases and people feel relaxed.

The degree to which light exposure affects circadian rhythm is dependent upon many factors, including intensity, duration, wavelength, and exposure time. The light wavelength range where melatonin is suppressed for humans is reported as 420 nm to 480 nm. Others have suggested a narrower range, from 446 nm to 484 nm as having the most effect on the circadian cycle. As discussed above, suppression of melatonin can affect the onset of sleep, and feelings of alertness and well-being.

The introduction of handheld and portable devices (for example, mobile phones and tablet computers) has changed the way people view light. With these devices, bright text, images, and video content is viewed throughout the day. Typically, most of these devices are based on colour generating displays (for example, liquid crystalline or organic light-emitting displays). One unintended consequence of viewing these displays is greater exposure to light, especially the blue wavelengths. For example, when users are reading or observing content in the evening hours, this can have the consequence of delaying the onset of sleep and result in the dysregulation of circadian rhythms. This dysregulation of circadian rhythms can produce sleeping and waking irregularities and feelings of unease, tiredness and a lack of well-being.

Additionally, people are spending more and more time indoors under artificial light that affects their circadian rhythm. In order to prevent melatonin suppression, many artificial lighting systems use blue light filters to attenuate some of the blue light spectrum. However, widespread use of blue light filters throughout the day may suppress the benefits of exposure to natural light and in some cases, can create a "jet lag" effect. For example, exposure to blue wavelengths of light early in the morning has a natural stimulating effect which many people do not get exposure to as a function of spending significant periods of time inside with artificial lighting systems. Studies of daylight monochromatic blue light exposure have shown a 30 minute exposure period to blue light produces optimal effects on alertness (Iskra-Golec et al. (2017) *Adv. Cogn. Psychol.* 13(3): 241-247).

Thus, there remains a need for devices to assist users in regulating their exposure to various wavelengths of light, including blue wavelengths of light.

SUMMARY

In one aspect, the present disclosure provides an optical device for enhancing the well-being of a wearer, the optical device comprising: a frame; at least one lens connected to the frame; at least one first filter configured to engage with the at least one lens, wherein the at least one first filter attenuates light at wavelengths in the visible blue light spectral region; at least one second filter configured to engage with the at least one lens, wherein the at least one second filter attenuates light at wavelengths of the visible spectral region outside of the visible blue light spectral region; and a modulating mechanism in communication with the frame, the at least one lens, the at least one first filter and/or the at least one second filter for modulating the at least one first filter and the at least one second filter.

In various aspects, the optical device is a pair of eyeglasses or goggles. In various embodiments, the optical device comprises two lenses.

In various aspects, the modulating mechanism comprises a switching mechanism. In various embodiments, the switching mechanism comprises a mechanical switch. In various embodiments, the switching mechanism comprises hinges on the frame or on the at least one lens, and connected to the at least one first filter and the at least one second filter. In various embodiments, the modulating mechanism comprises snaps on the frame or on the at least one lens for reversibly receiving the at least one first filter and the at least one second filter. In various embodiments, the modulating mechanism comprises an adhesive for reversibly adhering the at least one first filter and the at least one second filter to the at least one lens.

In various aspects, the at least one lens comprises first and second layers defining a cavity therebetween configured to engage the at least one first filter and the at least one second filter. In various embodiments, the at least one first filter and the at least one second filter comprise inserts. In various embodiments, the at least one first filter and the at least one second filter are electrochromic dyes. In various embodiments, the at least one first filter and the at least one second filter are thermochromic dyes. In various embodiments, the at least one first filter and the at least one second filter are liquid crystals or nanocrystals. In various embodiments, the at least one first filter and the at least one second filter are reversibly injectable liquids.

In various aspects, the optical device further comprises a controller for controlling the modulating mechanism. In various embodiments, the controller may comprise a GPS.

In various aspects, the optical device further comprises an energy source for modulating the at least one first filter and the at least one second filter.

In various aspects, the at least one first filter, the at least one second filter or both cover a surface area of the at least one lens. In other aspects, the at least one first filter, the at least one second filter or both cover different regions of the surface area of the at least one lens.

Other aspects and features of the present invention will become apparent to those of ordinary skill in the art upon review of the following description of specific embodiments of the invention in conjunction with the accompanying claims.

BRIEF DESCRIPTION OF THE DRAWINGS

In drawings which illustrate embodiments of the invention.

DETAILED DESCRIPTION

Figure 1:
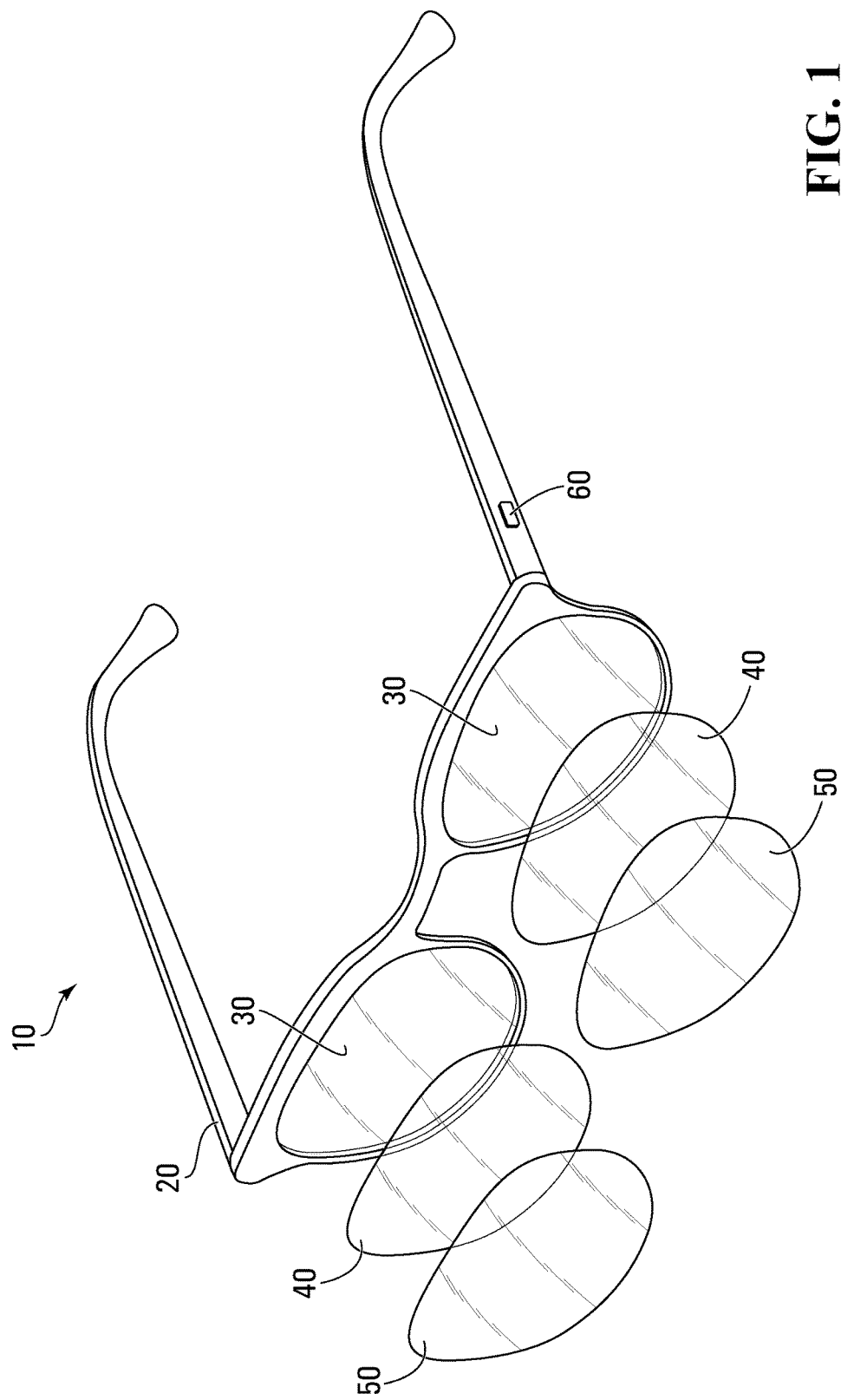
FIG. 1 shows an exploded view of an optical device according to an embodiment of the invention.

In the context of the present disclosure, various terms are used in accordance with what is understood to be the ordinary meaning of those terms.

Exposure to light has important effects on human physiology that are independent of visual perception. These non-image forming effects of light include the regulation of circadian rhythms, melatonin production, changes in core body temperature, sleep propensity and alertness. For example, prolonged exposure to blue wavelengths of light has been shown to have an alerting effect by suppressing melatonin production.

Disclosed embodiments include an optical device for enhancing the well-being of a wearer by allowing the wearer to regulate their exposure to various wavelengths of light, including the blue wavelengths of light. Thus, the wearer may limit their exposure to blue wavelengths of light in preparation for sleep, or enhance their exposure to blue wavelengths of light for desired times of alertness.

In various embodiments, the optical devices disclosed herein comprise a frame; at least one lens connected to the frame; at least one first filter configured to engage with the at least one lens, wherein the at least one first filter attenuates light at wavelengths in the visible blue light spectral region; at least one second filter configured to engage with the at least one lens, wherein the at least one second filter attenuates light at wavelengths of the visible spectral region outside of the visible blue light spectral region; and a modulating mechanism in communication with the frame, the at least one lens, the at least one first filter and/or the at least one second filter for modulating the at least one first filter and the at least one second filter.

The term "optical device" refers to any device used in connection with the eyes that contains a viewing window. Examples of optical devices include eyeglasses, goggles, visors and sunshades.

The term "wearer" refers to a mammal, preferably a human.

The term "visible spectral region" refers to the portion of the electromagnetic spectrum that is visible to the human eye. A typical human eye responds to wavelengths from about 380 nm to about 740 nm. The terms "visible blue light spectral region" and "blue wavelengths of light" refer to light having shorter wavelengths in the visible spectral region, generally ranging from about 380 nm to about 500 nm.

In various embodiments, the wearer may modulate or engage the at least one first filter with the at least one lens, thereby attenuating light at wavelengths in the visible blue light spectral region. In various embodiments, the wavelengths of light in the visible blue light spectral region passing through the at least one first filter and the at least one lens is reduced. Reducing the wavelengths of light in the visible blue light spectral region being viewed by the wearer may result in less suppression of melatonin and the wearer may feel more relaxed and ready for sleep.

The wearer may also modulate or engage the at least one second filter with the at least one lens, thereby attenuating light at wavelengths of the visible spectral region outside of the visible blue light spectral region. In various embodiments, the wavelengths of light outside of the visible blue light spectral region may be reduced. Reducing these wavelengths being viewed by the wearer allows relatively more blue wavelengths to reach the eyes of the wearer, thereby increasing suppression of melatonin and the user may feel more alert or energetic. In addition, by modulating the filters, the wearer may re-set his or her body clock to a more functional 24-hour cycle, which may occur in cases of "social jet-lag" caused by the differences between sleep cycles on work days as compared to non-work days.

In some embodiments, the wearer may modulate the filters to disengage the at least one first filter and the at least one second filter so that all of the visible light passes through the lenses of the optical device. In another embodiment, the optical device may include at least one third filter that blocks approximately 100% of light in the 280 nm to 400 nm spectral range. In combination with the at least one second filter blocking about 15% to about 60% of light in the 500 nm to 700 nm range (similar to sunglasses) but allowing blue wavelengths of light between 400 nm and 500 nm to pass through the lenses, the wearer may feel energetic and alert while being protected from the bright sunlight.

By including both the at least one first filter and the at least one second filter with the same optical device, the wearer can modulate or attenuate the wavelengths of light being viewed, either to promote sleep or to promote alertness. In various embodiments, the wellbeing of the wearer is increased as the wearer can feel more alert and energetic for waking hours, or more relaxed and prepared for sleep. The wearer may engage the at least one second filter to feel more alert in the morning or in the early afternoon, and then engage the at least one first filter to feel more relaxed and ready for sleep in the early evening. The wearer may also wear the optical device without the filters being engaged or modulated.

The wearer may use the optical device outdoors or indoors to mitigate the negative effects of artificial lighting on their circadian rhythm at the wrong time of day and/or simulate the natural light exposure they need while continuing being indoors and going about their lives and/or jobs.

The attenuation of the light by the at least one first filter and the at least one second filter is designed to comprise a controlled and limited amount of filtering rather than a total blocking of a wavelength region. If all of the light in a given range of the visible spectral region is blocked, it may disadvantageously hinder or interfere with colour perception. In addition, previous studies have suggested that even partial attenuation of light exposure can have beneficial effects for well-being and health.

Filtering significantly less than 100% of the light in a given region can be effective in creating a noticeable and helpful reduction in light exposure of a certain wavelength, and yet maintain overall luminous transmittance near a desired value for the optical device.

An optical device 10 according to an embodiment of the invention is shown in FIG. 1. The optical device 10 comprises a frame 20, at least one lens 30 connected to the frame 20, at least one first filter 40 configured to engage with the at least one lens 30, wherein the at least one first filter attenuates light at wavelengths in the visible blue light spectral region, at least one second filter 50 configured to engage with the at least one lens 30, wherein the at least one second filter 50 attenuates light at wavelengths of the visible spectral region outside of the visible blue light spectral region, and a modulating mechanism 60 in communication with the frame 20, the at least one lens 30, the at least one first filter 40 and/or the at least one second filter 50 for modulating the at least one first filter 40 and the at least one second filter 50.

In various embodiments, the optical device 10 is a pair of goggles and comprises one lens 30. As shown in FIG. 1, the optical device 10 may be a pair of eyeglasses and comprise two lenses 30.

In various embodiments, the at least one first filter 40 attenuates light at wavelengths between about 380 nm to about 500 nm or any range therebetween. For example, the at least one first filter 40 may attenuate light at wavelengths between about 420 nm to about 480 nm, about 400 nm to about 460 nm, or about 420 nm to about 475 nm. The at least one first filter 40 may filter or block about 15% to about 75% of the light of the foregoing wavelength ranges or any amount therebetween. For example, the at least one first filter 40 may filter or block about 20% to about 50%, about 25% to about 45%, about 25% to about 55%, or about 65% to about 75% of the light of the foregoing wavelength ranges. The at least one first filter 40 may filter or block about 71% of the light of the foregoing wavelength ranges.

In various embodiments, the at least one second filter 50 attenuates light at wavelengths between about 500 nm to about 700 nm or any range therebetween. For example, the at least one second filter 50 may attenuate light at wavelengths between about 500 nm to about 565 nm, about 565 nm to about 590 nm, about 590 nm to about 625 nm, about 625 nm to about 700 nm, about 500 nm to about 600 nm, or about 585 nm to about 685 nm. The at least one first filter 50 may filter or block about 15% to about 86% of the light of the foregoing wavelength ranges or any amount therebetween. For example, the at least one second filter 50 may filter or block about 20% to about 50%, about 25% to about 45%, about 25% to about 55%, about 30% to about 70%, about 80% to about 86%, or about 40% to about 80% of the light of the foregoing wavelength ranges.

In various embodiments, the at least one first filter 40 and the at least one second filter 50 may cover the entire surface area of the at least one lens 30 as shown in FIG. 1, or a portion thereof. For example, the at least one lens 30 may comprise regions of the at least one first filter 40 and regions of the at least one second filter 50. The regions may comprise linear or vertical parallel portions, alternating regions, or any other arrangement within the knowledge of a person of ordinary skill in the art.

In various embodiments, the modulating mechanism 60 may be any mechanism in communication with the frame, the at least one lens, the at least one first filter 40 and/or the at least one second filter 50 which modulates the at least one first filter 40 and the at least one second filter 50. The term "modulating mechanism" refers to any means for adjusting, engaging, tuning, varying or modifying the at least one first filter 40 and the at least one second filter 50 such that the filters are engaged with the at least one lens 30 or the frame 20 and can attenuate the wavelengths of light viewed by the wearer of the optical device 10. The at least one first filter 40 and the at least one second filter 50 may be modulated between "on" and "off" configurations. The at least one first filter 40 and the at least one second filter 50 may also be modulated between different configurations where the filters are partially engaged. The at least one first filter and the at least one second filtered may be tuned to adjust for the wearer's alertness or energy levels as well as to enhance focus.

In various embodiments, the modulating mechanism 60 may be a switching mechanism to switch between the at least one first filter 40 and the at least one second filter 50, thereby attenuating the visible spectral region light passing through the filter and lens and being viewed by the wearer. The modulating mechanism 60 may be manual or automatic.

In one implementation, the modulating mechanism 60 may comprise a mechanical switch such as, for example, rotation of the filters about an axis of rotation. The mechanical switch may comprise a biasing member, such as a spring or stepped motor. In one embodiment, the modulating mechanism may be a slider that is mounted on the optical device 10 so that the at least one first filter 40 and the at least one second filter 50 can be manually changed by sliding the slider up-down or left-right depending on the exact position on the slider at the optical device 10. The switching mechanism may also comprise hinges on the frame 20 or on the at least one lens 30, and connected to the at least one first filter 40 and the at least one second filter 50.

In various embodiments, the modulating mechanism 60 may comprise snaps on the frame 20 or on the at least one lens 30 for reversibly receiving the at least one first filter 40 and/or the at least one second filter 50. In this embodiment, the at least one first filter 40 and the at least one second filter 50 are manually modulated.

In various embodiments, the modulating mechanism 60 may comprise an adhesive for reversibly adhering the at least one first filter 40 and the at least one second filter 50 to the at least one lens 30. In this embodiment, the at least one first filter 40 and the at least one second filter 50 are films or sheets and the adhesive may be located on the filters, on the at least one lens 30, or both.

The at least one lens 30 may comprise first and second layers defining a cavity therebetween configured to engage the at least one first filter and/or the at least one second filter. In various embodiments, the filters may comprise inserts. The inserts may be made of any suitable polymeric material.

In various embodiments, the at least one first filter 40 and the at least one second filter 50 may comprise any suitable optical filter as would be known to a person of ordinary skill in the art. Alternatively, the at least one first filter 40 and the at least one second filter 50 may comprise one or more electrochemical dyes, thermochromic dyes, liquid crystals, nanocrystals, electrochromic polymers or other active filtering agent that requires an energy source (e.g., electrical, magnetic, heat, etc.) to change optical density or hue. For these filters, the energy source or attachments for the energy source may be either remote or incorporated into or with the at least one lens 30, or into or with the frame 20. In various embodiments, the filters can be electrochromic pigments that are applied to a surface of the at least one lens 30 of the optical device 10 or on a substrate. By energizing or de-energizing the electrochromic pigments, the wearer can change the properties of the surface, such as, opacity and colour, for example. For example, the electrochromic pigments can use polychromatic electrochromic polymer technology of Chromatix™.

Figure 2:
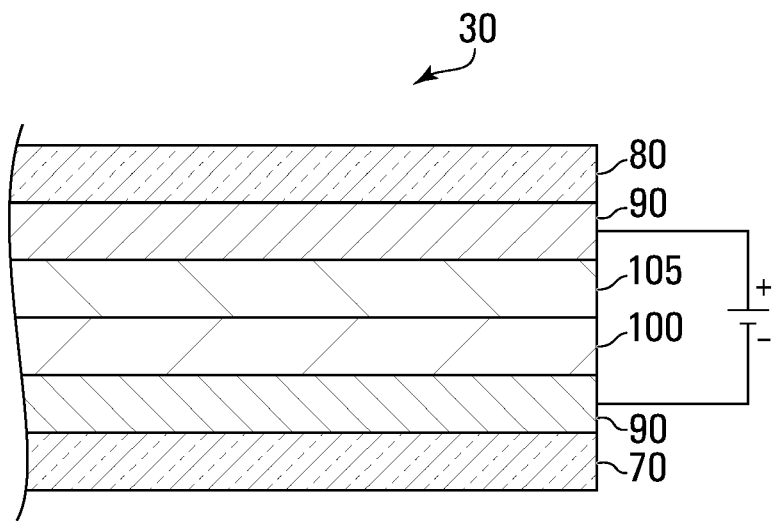
FIG. 2 shows a structure of an at least one lens according to an embodiment of the invention.
Figure 3:
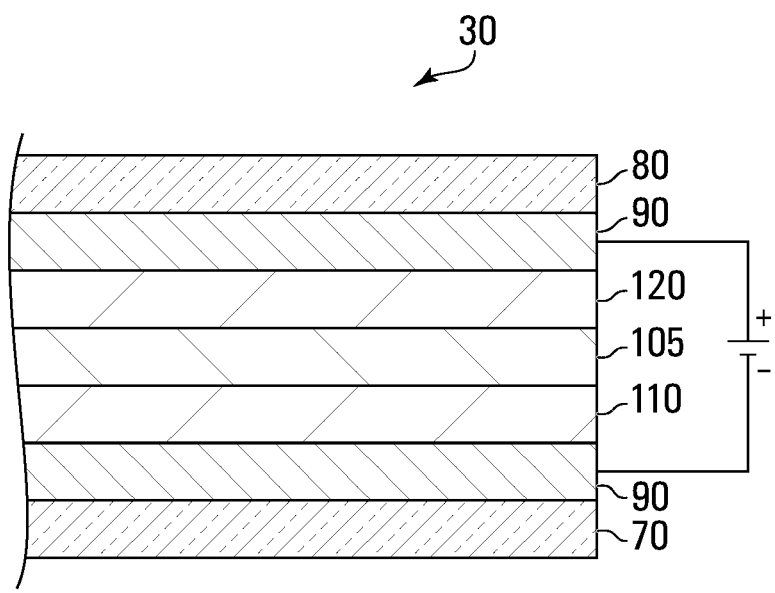
FIG. 3 shows a structure of an at least one lens according to a further embodiment of the invention.

FIGS. 2 and 3 show examples of the at least one lens 30 where the at least one first filter 40 and the at least one second filter 50 comprise electrochromic dyes or polymers. The at least one lens 30 comprises first and second substrates 70 and 80, respectively, and electrodes 90. In the embodiment shown in FIG. 2, the electrochromic dye or polymer 100 has at least two redox states such that a first redox state acts as the at least one first filter 40 and a second redox state acts as the at least one second filter 50. Lastly, the at least one lens 30 comprises an electrolyte 105. In the embodiment shown in FIG. 3, the at least one lens comprises separate electrochromic polymers or electrochromic dyes 110 and 120 which each act as either the at least one first filter 40 or the at least one second filter 50. In various embodiments, the electrochromic polymers or dyes are separated by electrolyte 105.

Figure 4:
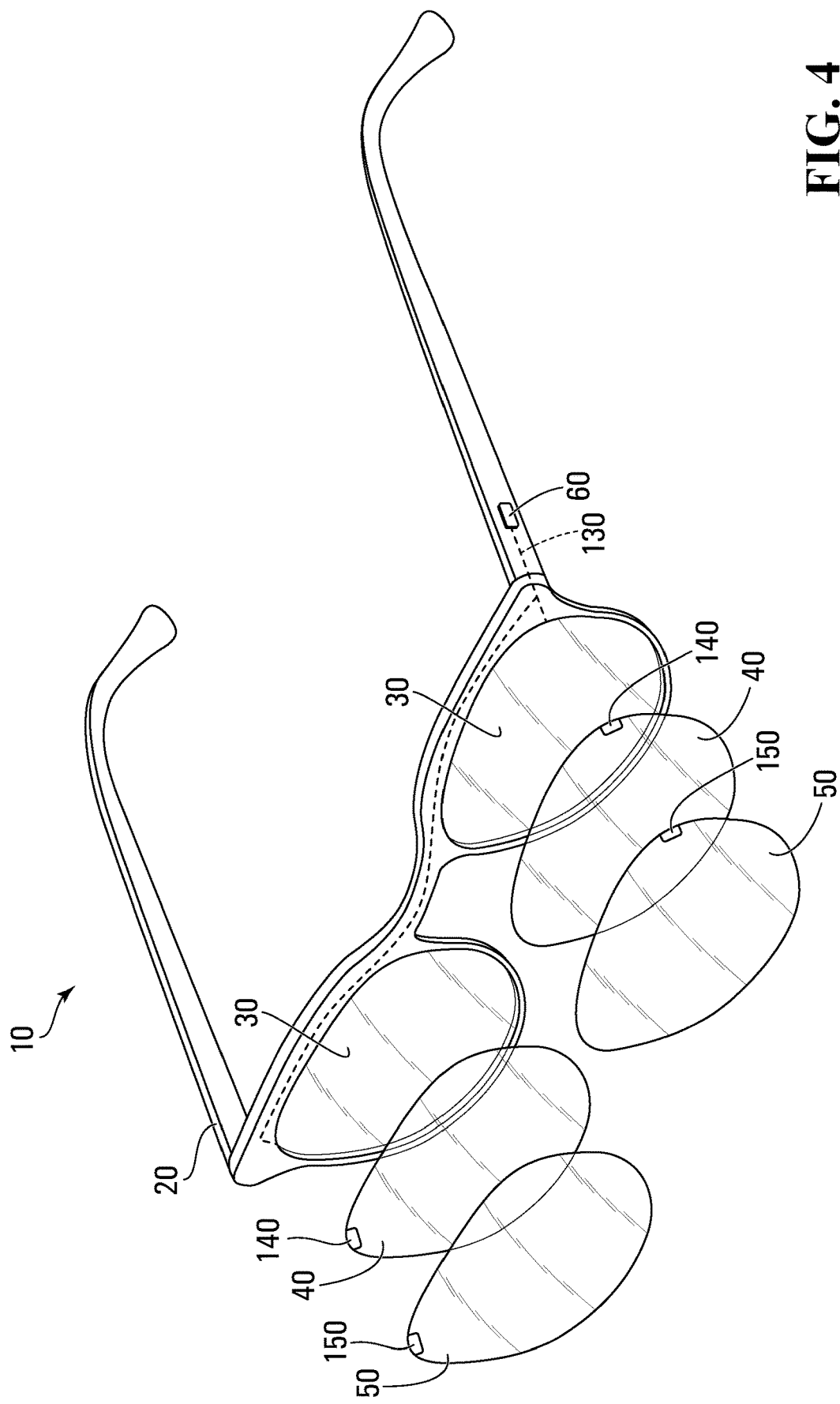
FIG. 4 shows an exploded view of an optical device according to a further embodiment of the invention where the modulating mechanism is in electrical contact with the at least one first filter and with the at least one second filter.

FIG. 4 shows the optical device 10 of various embodiments of the invention where the modulating mechanism 60 is in electrical contact 130 with one or more contacts 140 on the at least one first filter 40 and with one or more contacts 150 on the at least one second filter 50. The energy source (not shown) may be integrated with the modulating mechanism 60. In various embodiments, the at least one lens 30 of the optical device 10 may comprise a solar cell. The transparent solar cell can be integrated into one or more of the at least one lens 30 so that it can be charged up by predetermined blue wavelengths of light. After the cell is charged up, it will start blocking such blue wavelengths of light.

Figure 5:
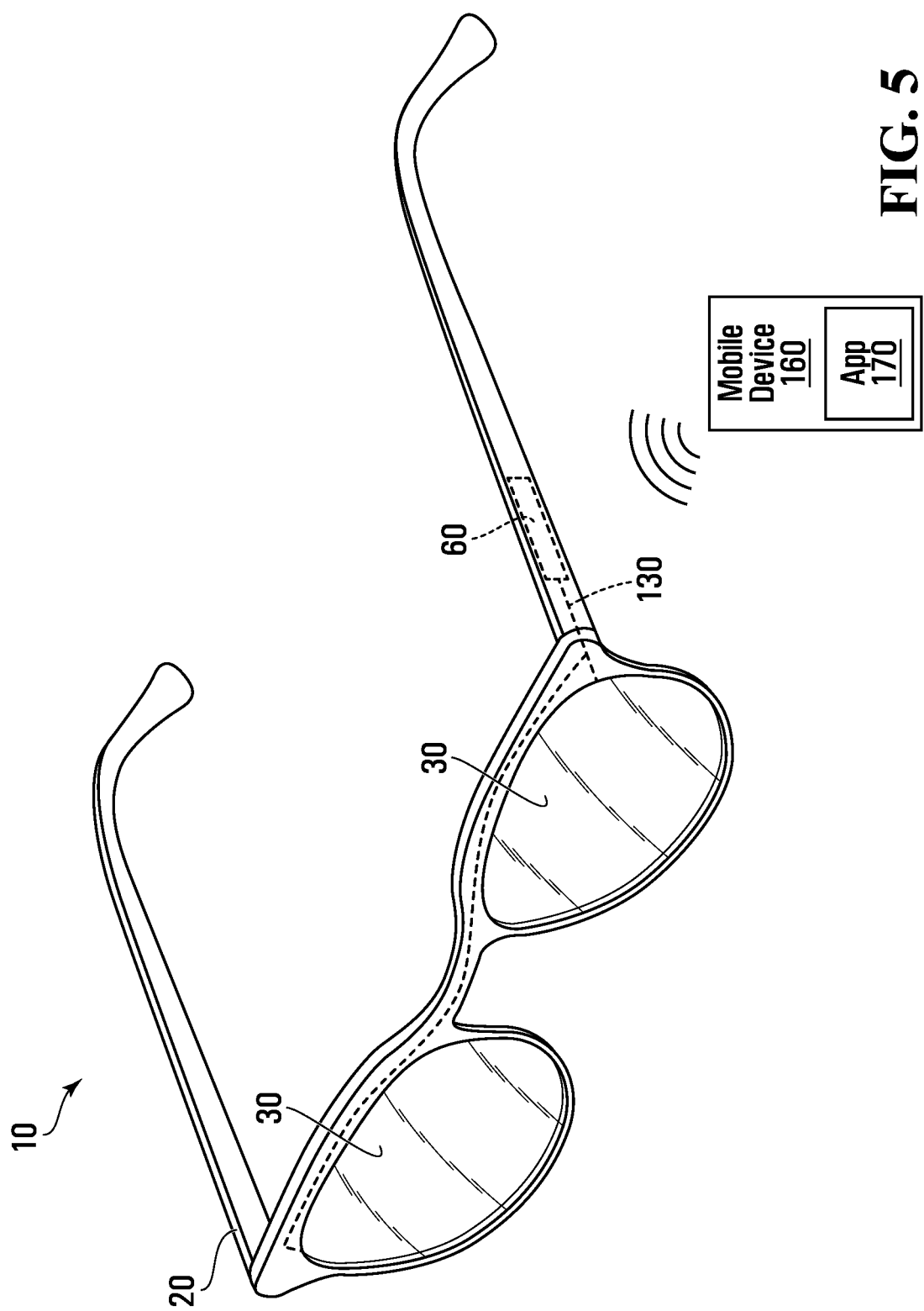
FIG. 5 shows an optical device according to a further embodiment of the invention wherein the modulating mechanism on the optical device is in wireless contact with a controller.

The optical device 10 may also comprise a controller 160 for controlling the modulating mechanism 60 as shown in FIG. 5. The controller 160 may be any system as known to a person of ordinary skill in the art. The controller may receive an input signal from the wearer or instructions from a memory of the controller 160 to modulate the modulating mechanism 60. The input signal may be received with wires, or wirelessly as shown in FIG. 5, using any of various communications protocols. The controller 160 then sends an output signal to the modulating mechanism 60. In various embodiments, the controller 160 may also comprise a GPS, such that the modulating mechanism 60 is modulated based on time of day in the location of the wearer. Such an embodiment may enhance the wellbeing of the wearer by assisting the wearer to adapt to time-zone changes when travelling.

In various embodiments, the modulating mechanism 60 may be a touch pressure switch that is positioned in or on the optical device 10 as shown in FIG. 4 or remotely from the optical device 10 as shown in FIG. 5. For example, the switch can be positioned on any other wearables or products, such as, for example, a watch, a phone, a ring, or a necklace, and can be in communication with the optical device wirelessly. In one embodiment, the modulating mechanism 60 can comprise touch-sensitive potentiometer such that the wearer can change the filter state through a touch panel that is located on the optical device 10 or remotely. In implementations where the optical device 10 is eyeglasses, the pressure sensor or touch potentiometer can be positioned at one or both of the arms of the frame 20, so by pulling or bending the arm in one direction (for example, in a direction away from the wearer's head/ear), the wearer can manually modulate the at least one first filter 40 and/or the at least one second filter 50.

In some implementations, the at least one first filter 40 and the at least one second filter 50 can be changed through exposure to a magnetic field. For example, a permanent magnet positioned remotely from the optical device 10 can be used to modulate the at least one first filter 40 and/or the at least one second filter 50. For example, the magnet can be incorporated in a ring or any other suitable wearable. By waving such wearable in proximity to the optical device 10, the wearer can modulate the at least one first filter 40 and the at least one second filter 50. A NFC tag that is incorporated in a smart watch or cell phone can be used to switch the filters in a similar fashion.

In various embodiments, the modulating mechanism 60 can modulate the at least one first filter 40 and the at least one second filter 50 automatically. For example, an app 170 for a phone or smart watch can modulate the at least one first filter 40 and the at least one second filter 50 based on the time of the day, location and/or weather. Such data can be fed into the app 170 from an external or internal GPS or other apps and based on such data, the app can trigger the modulating mechanism 60. In one embodiment, a light sensor can be integrated into or attached to the optical device 10 or another wearable, and based on the detected light composition (e.g. UV monitoring or intensity of light), the at least one first filter 40 or the at least one second filter 50 can be modulated. For example, the light sensor can be photovoltaic cell. In another embodiment, the modulating mechanism 60 can modulate the at least one first filter 40 and the at least one second filter 50 based on the wearer's biometrics such as, for example, the wearer's cortisol level, eye strain, or alertness. For example, a cortisol sensor (for example, a patch attached to the wearer's skin) can measure a cortisol level and can provide such measurements to the controller 160 that is controlling the modulating mechanism 60. Such signals alone or in combination with other signals can be used to trigger the modulating mechanism 60. In one embodiment, the optical device 10 can comprise one or more EEG sensors to detect the alertness and/or focus state through measuring brain activity of the wearer. The signals from the wearer's brain activity measurements can be combined with other physiological signals (such as, for example, heart rate, breath rate, etc.) as well as other data, such as time of the day, geolocation, etc., to pre-program the modulating mechanism 60. In addition, the controller 100 for the modulating mechanism 60 can also use wearer personal data with or without combination with wearer biometrics. In some implementations, the optical device 10 can comprise an infrared (IR) sensor so that it can sense when the wearer uses the optical device 10. Only then would the modulating mechanism 60 be active, meaning that the modulating mechanism 60 and all the other sensors and controls will work only when the optical device 10 is in use and not waste power when the device is not in use (power safe mode).

In various embodiments, the optical device 10 can comprise an internal timing device such as, for example, a clock integrated with the optical device. The time can be pre-set to trigger the modulating mechanism 60 to modulate the at least one first filter 40 and the at least one second filter 50 at the pre-determined time. In such embodiments, the optical device 10 can be self-sustained and does not depend on external timing devices.

In various embodiments, the modulating mechanism 60 can be motion controlled. The optical device 10 may comprise one or more motion detection devices (for example, an accelerometer) to detect movements of the wearer and based on certain movements, it can trigger the modulating mechanism 60 to modulate the at least one first filter 40 and the at least one second filter 50. For example, the motion sensor can detect when a wearer tilts his/her head (i.e., up, down, on the side, circle, etc.) for a certain amount of time (e.g. more than 3 seconds) and will send a signal to the modulating mechanism 60 to modulate the at least one first filter 40 and/or the at least one second filter 50. In some implementations, the modulating mechanism 60 may be triggered by eye gesture (eye movement) or hand gesture/movement. In various embodiments, the modulating mechanism 60 can be voice controlled (e.g. can be pre-programmed such that one or more specific sounds can act as a trigger).

In various embodiments, and to avoid false triggering, the modulating mechanism 60 may first be put in a charge mode by switching it on. For example, a switch, such as a push button, can be provided on the frame 20 to put the modulating mechanism 60 in a charge mode before it is triggered by, for example, the motion controller, pressure controller, or any other suitable controller as described herein.

Figure 6:
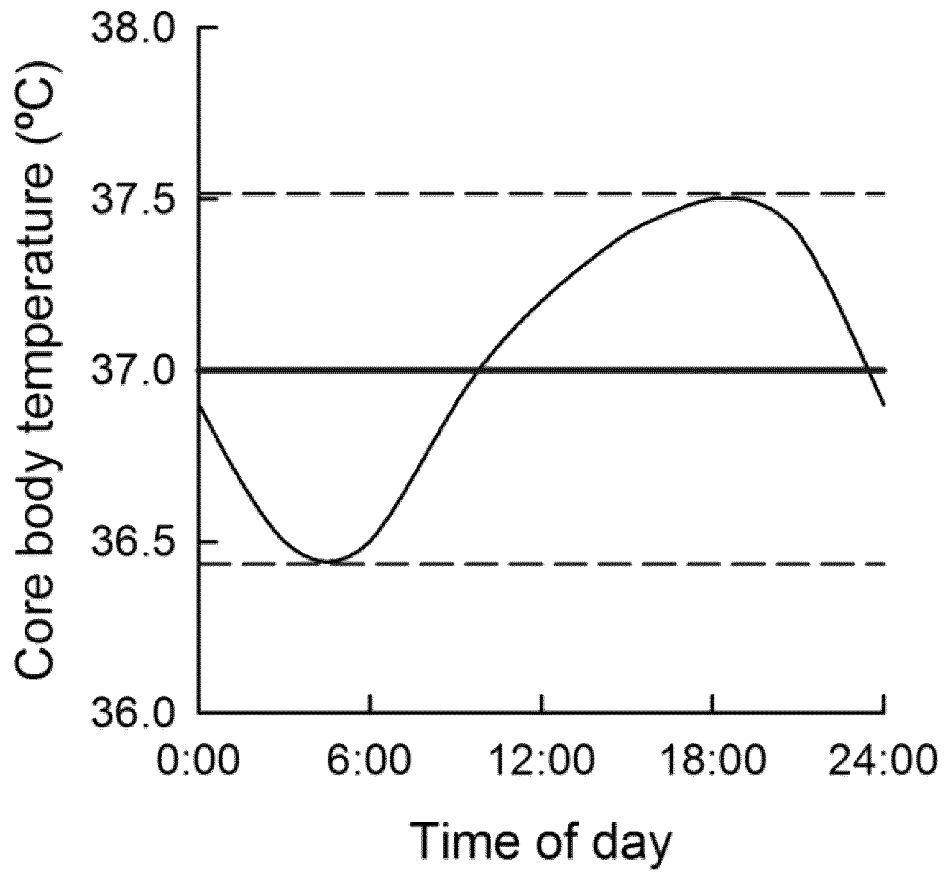
FIG. 6 shows the circadian rhythm exhibited by human core body temperature under resting conditions.

In various embodiments, the optical device may comprise a temperature sensor to sense the wearer's body temperature. FIG. 6 shows the circadian rhythm exhibited by the human core body temperature under resting conditions. During any given day, core body temperature fluctuates around 37° C. During the early morning, core body temperature is about 0.5° C. below 37° C., and in the late afternoon, core body temperature is about 0.5° C. above 37° C. and then drops during the evening, triggering the onset of sleep. This fluctuation may be used to trigger the modulating mechanism 60.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. An optical device for enhancing well-being of a wearer, the optical device comprising:
a frame;
at least one lens connected to the frame;
two or more filters configured to engage with the at least one lens,
wherein at least one first filter attenuates about 15% to about 86% of light at wavelengths in the visible blue light spectral region between about 400 nm and about 480 nm to reduce the wearer's exposure to light in the visible blue light spectral region and promote production of melatonin, and
wherein at least one second filter attenuates light at wavelengths of the visible spectral region outside of the visible blue light spectral region, blocking about 15% to about 60% of light in the 500 nm to 700 nm range to increase the wearer's exposure to light in the visible blue light spectral region and suppress production of melatonin; and
a modulating mechanism in communication with the frame, the at least one lens, the at least one first filter and the at least one second filter for modulating the at least one first filter and the at least one second filter,
wherein the modulation mechanism assists the wearer in regulating exposure to various wavelengths of light, wherein when the at least one first filter is engaged with the at least one lens, less melatonin is suppressed thereby promoting sleep, and wherein when the at least one second filter is engaged with the at least one lens, more melatonin is suppressed thereby promoting alertness.

2. The optical device of claim 1, wherein the optical device comprises two lenses.

3. The optical device of claim 1, wherein the modulating mechanism comprises a switching mechanism.

4. The optical device of claim 3, wherein the switching mechanism comprises a mechanical switch.

5. The optical device of claim 1, wherein the modulating mechanism comprises snaps on the frame or on the at least one lens for reversibly receiving the at least one first filter and the at least one second filter.

6. The optical device of claim 1, wherein the modulating mechanism comprises an adhesive for reversibly adhering the at least one first filter and the at least one second filter to the at least one lens.

7. The optical device of claim 1, wherein the at least one lens comprises first and second layers defining a cavity therebetween configured to engage the at least one first filter and the at least one second filter.

8. The optical device of claim 7, wherein the at least one first filter and the at least one second filter are thermochromic dyes.

9. The optical device of claim 7, wherein the at least one first filter and the at least one second filter are liquid crystals or nanocrystals.

10. The optical device of claim 7, wherein the at least one first filter and the at least one second filter are reversibly injectable liquids.

11. The optical device of claim 1, wherein the at least one first filter and the at least one second filter are electrochromic dyes or electrochromic polymers.

12. The optical device of claim 11, wherein the at least one first filter and the at least one second filter comprise first and second redox states, respectively, of one electrochromic polymer or electrochromic dye.

13. The optical device of claim 11, wherein the at least one first filter comprises a first electrochromic polymer or electrochromic dye and the at least one second filter comprises a second electrochromic polymer or electrochromic dye.

14. The optical device of claim 1, further comprising an energy source.

15. The optical device of claim 1, further comprising a controller for controlling the modulating mechanism.

16. The optical device of claim 15, where the controller comprises a GPS.

17. The optical device of claim 1, wherein the at least one first filter, the at least one second filter or both cover a surface area of the at least one lens.

18. The optical device of claim 1, wherein the at least one first filter, the at least one second filter or both each cover different regions of a surface area of the at least one lens.

* * * * *